Patented June 12, 1934

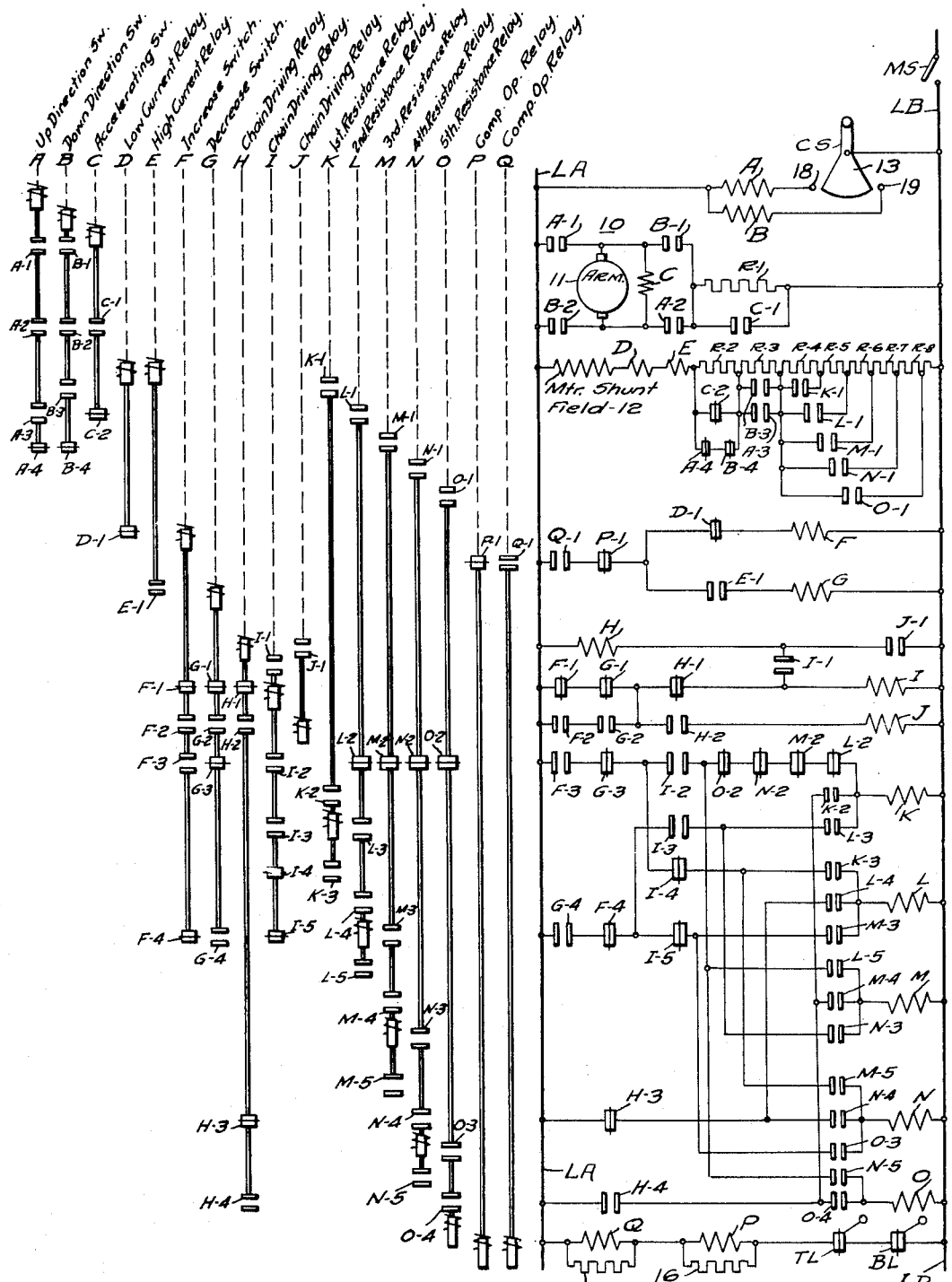

1,962,341

UNITED STATES PATENT OFFICE 1,962,341

CONTROL SYSTEM FOR DYNAMO-ELECTRIC MACHINES

William F. Eames, Edgewood, Pa., assignor to Westinghouse Electric Elevator Company, Chicago, Ill., a corporation of Illinois Application May 3, 1933, Serial No. 669,186

9 Claims. (Cl. 172—152)

My invention relates to control systems for dynamo electric machines, and more particularly to control systems for electric motors, such as are employed in the operation of elevators.

In constructing an elevator provided with modern starting, running and stopping means, it is very desirable to have a hoisting motor which will remain at a substantially constant speed regardless of changes in its load, in its resistance or in its supply voltage. The tendency of an elevator motor to change its speed in response to changes in its load has been practically eliminated, but considerable difficulty is still experienced by reason of the tendency of the motor to change its speed because of variations in its supply voltage or in its resistance. The change in resistance may be due to various causes, such as changes in temperature.

For instance, it is well known that when a motor is cold, as upon the initial starting operation, its speed, with a given voltage on its field windings, will be less than its speed, with the same voltage excitation, when it is warm. In other words, upon initially starting a motor, the normal speed will be less than that after the motor has been in operation a sufficient length of time to raise its temperature.

It is also well known that changes in the temperature of the atmosphere surrounding a motor will cause variations in its speed by reason of the variations of the effective resistance of the field windings.

Whenever a variation in the supply voltage or a change in the resistance of the field occurs, the current in the motor varies accordingly, as is well known. If the current in the motor can be maintained at a suitable value, the speed of the motor will remain constant.

Therefore, one of the objects of my invention is to maintain constant the current in the motor field.

Another object of my invention is to maintain constant each of several motor field currents where several operating values are employed.

Another object of my invention is to provide for compensating for change in the resistance of a motor field in accordance with the value of the current flowing in that field.

A further object is to provide a means of correction for a change in the resistance of a motor field or for a change in its supply voltage.

A still further object is to provide a motor compensating means which will not be sensitive to transient changes caused in the motor current by the inductance of the motor field.

It is also an object of my invention to obtain a given speed of a motor for a given armature voltage.

Other objects of the invention will in part be obvious and will in part appear hereinafter.

For a better understanding of my invention, reference may be had to the accompanying drawing, in which the sole figure is a diagrammatic representation of an elevator control system embodying my invention.

The right-hand portion of the drawing is a straight line representation of the control circuit and the left-hand portion is an illustration of the relays included in that circuit. The relays in the left-hand portion are shown in alphabetical order and their coils and contact members are disposed on horizontal lines corresponding to their positions in the straight line portion of the drawing to enable the reader to readily determine the name of any relay, the number and kind of its contact members and the position of its coil and contact members in the circuit shown in the straight line portion of the drawing.

Referring more particularly to the drawing, I have illustrated therein a dynamo-electric machine such as an elevator hoisting motor 10 having an armature 11 and a shunt field winding 12, disposed to receive electrical energy from a pair of supply conductors LA and LB.

The field 12 is connected across the supply conductors to supply a "standing" field when the supply conductors LA and LB are connected through a master switch MS to a suitable source of electrical energy (not shown).

As a means for starting, controlling and stopping the hoisting motor 10, I have provided a car switch CS which may be disposed at any suitable place such as in an elevator car (not shown). The car switch controls the motor through an "up" direction switch A and a "down" direction switch B. When the car switch is moved in a clockwise direction, the "up" direction switch A is energized to close its contact members A1 and A2 for connecting the armature 11 to the supply conductors LA and LB for operating the motor to move the car in the "up" direction. When the car switch is moved in a counter-clockwise direction, the down direction switch B is energized to close its contact members B1 and B2 for connecting the armature to the supply conductors for operating the motor to move the car in the "down" direction.

Hence it is seen that the master switch MS is closed to prepare the system for operation and that the motor is started and stopped by operation of the direction switches A and B.

A resistor R3 is disposed in series with the field winding 11 for producing a standing field current of suitable value in the motor when the motor is stopped with the master MS switch in the closed position and the car switch CS in its open position. The standing field resistor is controlled by the contact members A3 and B3 of the "up" and "down" direction switches A and B, which short out the resistor when one of the direction switches is closed to start the motor.

An intermediate speed resistor R1 is connected in series with the armature 11 for raising the motor speed from its starting speed to its full-field running speed, that is, its intermediate speed. The resistor R1 is controlled by a counter-electromotive force relay C connected across the terminals of the armature in such manner that it is energized to close its contact members when the motor reaches a predetermined speed and thereby short circuits the resistor R1.

A high speed resistor R2 is placed in series with the field winding 12 for increasing the full-field running speed to a weak field running speed, or high speed. The high speed resistor is shown as controlled by the contact members C2 of the relay C, but it may be controlled by any other suitable relay if it is desired to increase the speed more gradually. The circuit for the resistor R2 is also interlocked with the circuit for the resistor R3 by means of contact members A4 and B4 on the "up" and the "down" direction switches to prevent the simultaneous inclusion of both resistors in the field circuit.

In order to keep the motor at a constant speed when the current varies for any reason, the resistance must be adjusted to such a value as will keep the current constant in value. As a means for adjusting the resistance in accordance with the value of the current, when the supply voltage to the motor field or the motor field resistance varies, I have provided a plurality of compensating resistors for the field winding and a means responsive to the value of the field current for controlling the connection of the compensating resistors to the winding.

The compensating resistors are designated as R4, R5, R6, R7 and R8 and are disposed to be connected in series with the motor field winding step-by-step as the current increases and to be disconnected therefrom, step-by-step, as the current decreases.

Any suitable means which will be responsive to the value of the field current may be employed for the purpose of controlling the compensating resistors in accordance with the field current. As one suitable means, I have provided a pair of measuring relays for the purpose, one a low-current relay D and the other a high-current relay E. Although the motor may be designed to operate at any desirable current value, in the present instance it is assumed that the motor is designed to operate with a standing field current of 3 amperes, a full field of 8 amperes for intermediate speed, and a weak field of 5 amperes for normal high speed. It is also assumed that the relay D is designed to drop out or open at 2.9 amperes and to pull up or close at 3.5 amperes, and the relay E to drop out or open at 3.1 amperes and pull up or close at 3.7 amperes.

The means through which the measuring relays D and E control the connection of the compensating resistors to the motor field circuit comprises a plurality of contact members K1, L1, M1, N1 and O1 operated by a plurality of "chain" resistance relays K, L, M, N and O.

The relays K, L, M, N and O are controlled by a plurality of chain-driving relays H, I and J which, in turn, are controlled by a current increase relay F and a current decrease relay G. The relay F is called a "current increase relay" because it is operated to effect an increase in the field current when that current falls below a predetermined value. The relay G is called a "current decrease relay" because it is operated to decrease the current in the field when that current rises above a predetermined value.

The current increase relay F and the current decrease relay G are controlled by the current measuring relays D and E.

It will be apparent that where several operating values of current are used, a compensation for a change in field resistance for one operating value will be equally effective in compensating for any other operating value. In other words, if the motor is compensated under standing field conditions, the compensation will serve equally well for running field conditions.

In practicing my invention it will be found, in view of the above facts, that it is not necessary to keep changing or adjusting the compensating resistance continuously but that all practical needs will be met if the value of the compensating resistance is adjusted at suitable intervals in accordance with the current in the field.

In the present system I select the suitable adjusting intervals as the periods when the motor is stopped with the elevator car at its lower terminal or at its upper terminal. One suitable manner in which to cause the adjustment or change in the compensating means to take place only at such periods is to prevent the operation of the increase and decrease relays at all other periods but to permit them to operate at the selected intervals when the car is at a terminal.

In order to prevent the increase and decrease relays F and G from being operated by the measuring relays, except when the car is stopped at one of its terminals, I provide a pair of compensator operating relays Q and P. These relays are connected to the supply conductors LA and LB by normally closed top and bottom limit switches TL and BL. The relays remain energized all the time except when the car opens one of the limit switches when arriving at a terminal.

The relay Q has a pair of normally open contact members Q1 disposed in series with the coils of the increase and decrease relays F and G. The relay P has a pair of normally closed contact members P1 also disposed in series with the coils of the increase and decrease relays F and G. Consequentially, the contact members Q1 and the contact members P1 must be closed at the same time before either the increase relay F or the decrease relay G may be energized by one of the measuring relays.

To accomplish this result, the relay Q is provided with a time delay coil 15, which prevents the relay from dropping out or opening for a period of 5 seconds after it is deenergized. The relay P is provided with a time delay coil 16, which prevents the relay from dropping out or opening for a period of 3 seconds after it is deenergized. The difference in the time limits provides a period of 2 seconds in which the relay Q is energized and the relay P is deenergized. During this 2 second period, the contact members Q1 and P1 are closed. Therefore, it is only during this 2 second period that the measuring relays, by operating either the contact members E1 or D1, can energize either the increase relay F or the decrease relay G.

Inasmuch as the relays P and Q remain energized at all times except when movement of the elevator car to its upper or its lower terminal opens the one or the other of the limit switches TL or BL, it is only when the car arrives at a terminal that the relays Q and P are deenergized to condition the relays F and G for operation during a period of 2 seconds.

With the above described arrangement, a full field is sent through the coils D and E, picking up both relays when the elevator starts. When the car comes to a terminal, one of the limit switches is operated to deenergize the relays Q and P. Thereupon the increase and decrease relays are rendered effective and responsive to the measuring relays for a period of 2 seconds. At this instant, if the standing field is too high, say at 3.2 amperes, both measuring relays stay picked up. Consequently the contact members D1 are open and the contact members E1 are closed thereby energizing the decrease relay G to cause sufficient compensating resistance to be inserted in the field circuit to decrease the standing field current to approximately 3 amperes.

It is desirable that the measuring relays always be in a picked up condition when the car comes to its terminal, in order that the relays may drop out or remain in accordance with the value of the standing field current. These relays would not work very well otherwise, because their pick up values are higher than their drop out values.

If the standing field current is at 3 amperes as it should be when the car stops, the measuring relay E drops out and the relay D stays up, in which condition the contact members D1 and E1 remain open and neither the increase relay F nor the decrease relay G operates and no change is made in the compensating resistance.

If the standing field current is at 2.9 amperes or less, both measuring relays D and E drop out, in which condition the contact members D1 are closed and the contact members E1 are open, thereby energizing the increase relay G to cause resistance to be removed from the field circuit to increase the standing field current to approximately 3 amperes.

The invention may be understood best from an assumed operation of the system. Assuming that the motor 10 is out of operation, that it is cold from having been idle a long time and that the master switch MS is closed to prepare the elevator system for operation; the closing of the master switch energizes the motor shunt field 12 by a circuit extending from supply conductor LA through the field winding 12, low current relay D, high current relay E, the contact member C2 and resistors R3, R4, R5, R6, R7 and R8 to the supply conductor LB. As a result of this connection, the motor field builds up to a current value of 3 amperes by reason of the resistor R3 being included in the field circuit. It may also be noted that the compensating resistors R4, R5, R6, R7, R8 are included in the motor field because the motor is cold and the field resistance is low.

The closing of the master switch also energizes the chain driving relay I to prepare the compensating system for operation, by means of a circuit extending from supply conductors LA through contact members F1, G1 and H1 and the coil I to supply conductor LB.

Assuming that the car is standing midway between the upper and the lower terminal and that the car switch CS is moved in a clockwise direction to start the motor for the purpose of moving the car upwardly; this energizes the "up" direction switch A by a circuit extending from the supply conductor LA through the coil A and the contact members 18 and 13 of the car switch CS to the supply conductor LB.

The energization of the "up" direction switch A closes its contact members A1 and A2 in the circuit of the armature 11, thereby energizing the armature and thus starting the motor, through a circuit extending from the supply conductor LA through contact members A1, the armature 11, the contact members A2 and the resistor R1 to the supply conductor LB.

The energization of the "up" direction switch A also closes its contact members A3 to short circuit the standing field resistor R3 in the field winding, thereby strengthening the motor field to a full field of 8 amperes for operating the motor at its low speed.

The strengthening of the field current also causes both measuring relays D and E to be energized because the field is now strong enough to energize both relays and pull them up.

As the armature speed increases, the counter electromotive force builds up until the relay C energizes to close its contact members C1 and to open its contact members C2. The closing of the contact members C1 short circuits the resistor R1 in the armature circuit, thereby strengthening the armature current and causing the motor to run at its intermediate speed. The opening of the contact members C2 inserts the resistor R2 in the motor field circuit, thereby weakening the motor field to approximately 5 amperes and causing the motor to increase to its high speed which may be termed its normal operating speed.

It may also be noted that the compensator operating relays Q and P were energized by the closing of the master switch MS, by a circuit extending from the supply conductor LA through the coil Q, the coil P, the contact members of the top limit switch TL and the contact members of the bottom limit switch BL to the supply conductor LB.

Assuming that the car continues its upward movement until it nears the upper terminal, at which time the car switch CS is centered to stop the car by deenergizing the up direction switch A; the deenergization of the up direction switch A opens its contact members A1 and A2 thereby deenergizing the motor armature 11 to stop the motor. Upon deenergization of the up direction switch A its contact members A3 open to re-insert the standing field resistor R3 in the motor field circuit, and its contact members A4 close to eliminate the resistor R2 from the field circuit.

As the motor comes to a stop, the counter electromotive force weakens to such a point that the relay C opens its contact members C1, thereby re-inserting the low speed resistor R1 in the armature circuit. This operation of the relay C also closes its contact members C2 to short circuit the resistor R2 in the motor field circuit thereby preparing the circuit for the next starting operation.

The final movement of the car to its upper terminal opens the top limit switch TL thereby deenergizing the compensator operating relays Q and P. As heretofore described, the relay Q opens 5 seconds and the relay P opens 3 seconds after they are deenergized. Therefore, during a period of 2 seconds the relay Q is still closed while the relay P is open. During this 2 second period, the contact members Q1 and P1 in the circuit for the increase and decrease relays F and G are both closed thereby permitting the operation of the increase and decrease relays during this period by the measuring relays D and E.

As the car stops at the upper terminal, the field current has been reduced to and remains steady at, say, 2.7 amperes, because the heat generated in the motor by its operation has increased the resistance of the field winding at this value, both measuring relays D and E are deenergized because they are both designed to be deenergized at higher values than 2.7 amperes.

The deenergization of the measuring relay D returns its contact members D1 to their closed position in the circuit of the increase relay F, thereby energizing that relay for the purpose of eliminating sufficient resistance in the motor field circuit to increase the current in the field up to the desired 3 amperes.

The energization of the increase relay F opens its contact members F1, thereby opening the short circuit around the chain driving relay H and causing that relay to be energized by a circuit extending from the supply conductor LA through the coil H, the contact members I1 and the coil I to supply conductor LB.

The energization of the relay H opens its contact members H1 and H3 and closes its contact members H2 and H4. The closing of the contact members H4 prepares a self-holding circuit for the resistance relay K. The operation of the remaining contact members prepares certain relays for future operation.

The closing of the contact members F3 of the energized increase relay F completes a circuit for energizing the resistance relay K, extending from the supply conductor LA through contact members F3, G3, I2, O2, N2, M2, L2 and the coil K to the supply conductor LB.

The energization of the relay K closes its contact members K1 thereby removing the compensating resistor R4 from the motor field winding to restore the strength of the field winding to its normal figure of approximately 3 amperes for the desired standing field condition.

The energization of the resistance relay K also closes its contact members K2 thereby completing a self-holding circuit extending from the supply conductor LA through the contact members H4 and K2 and the coil K to the supply conductor LB.

It is to be understood that these relays work very rapidly and complete their compensating action within the 2-second period. At the end of the 2-second period during which the increase relay F is energized, the relay Q opens its contact members Q1 and thereby deenergizes the relay F. Upon being deenergized, relay F closes its contact members F1, thereby energizing the chain operating relay J by a circuit extending from supply conductor LA through contact members F1, G1, H2 and the coil J to supply conductor LB.

The energization of the relay J closes its contact members J1 thereby maintaining relay H energized and shorting out the relay I, to prepare the chain operating relays for subsequent operation.

By reason of the operation so far described, the car is standing at the upper terminal and the hoisting motor has had sufficient compensating resistance included in its field circuit to compensate for the change in its resistance caused by the warming up of the motor upon being placed in operation.

Assuming now that the car switch CS is moved in a counter-clockwise direction to start the car downward, this closes the car switch contact members 13 and 19, thereby energizing the down direction switch coil B. The energization of the down switch B closes its contact members B1 and B2 for energizing the motor 10 to start the car downwardly by a circuit extending from the supply conductor LA through the contact members B2, the armature 11, the contact members B1 and the resistor R1 to the supply conductor LB.

The energization of the down direction switch B also closes its contact members B3 to short circuit the resistor R3 in the field winding, thereby strengthening the motor field to a full field of 8 amperes for operating the motor at its low speed.

The strengthening of the field circuit also energizes both measuring relays D and E.

As the armature speed increases, the relay C closes its contact members C1 and opens its contact members C2. The closing of the contact members C1 short circuits the resistor R1 in the armature circuit therby strengthening the armature current and causing the motor to run at its intermediate speed. The opening of the contact member C2 reinserts the resistor R2 in the motor field circuit thereby weakening the motor field and causing the motor speed to increase to what may be termed its normal operating speed.

As the car leaves the top terminal, the limit switch TL closes thereby energizing the compensator operating relays Q and P.

Assuming now that the car is operated in the usual manner until it is near the lower terminal and that as it reaches this point, the car switch CS is centered to stop the car at the terminal, the centering of the car switch deenergizes the down direction switch B which thereupon opens its contact members B1, B2 and B3 and closes its contact members B4. The opening of the contact members B1 and B2 deenergizes the armature 11 thereby stopping the hoisting motor. The opening of the contact members B3 reinserts the standing field resistor R3 in the motor field circuit. The closing of the contact members B4 eliminates the resistor R2 from the motor field circuit.

As the motor comes to a stop, the relay C opens its contact members C1 thereby reinserting the low speed resistor R1 in the armature circuit. This operation of the relay C also closes its contact members C2 to short circuit the resistor R2 in the motor field circuit thereby preparing the circuit for the next starting operation.

The motor is now stopped with a standing field and the field current weakens to say 2.95 amperes because the heat generated in the motor during its operation has increased the resistance of the field winding to only a small extent.

As the car arrives at the bottom floor terminal, the motor limit switch BL opens thereby deenergizing the relays P and Q. Thereupon relay P closes its contact members P1 after 3 seconds and the contact members Q1 remain closed for 5 seconds; thus, as before stated, there is a 2 second period during which the contact members P1 and Q1 are closed thereby preparing the circuits of the increase relay F and the decrease relay G for operation by the measuring relay.

As stated above, the standing field current is now 2.95 amperes. At this value, the measuring relay E has dropped out because it drops out below 3.1 amperes but the measuring relay D has not dropped out because it will not drop out until the current is below 2.9 amperes. Therefore, the contact members D1 and the contact members E1 in the circuits for the increase and decrease relays are both open and both the relay F and the relay G remain deenergized. Inasmuch as both the increase and the decrease relays are deenergized, no change in the compensating resistors takes place because of the arrangement of the contact members F3 and G3 and G4 and F4 in the circuits of the general relays. It will thus be seen that no change in the compensating resistance will be effected unless the standing field current increases to 3.1 amperes or decreases to 2.9 amperes, it being assumed that anything within this range will be sufficiently close to the selected point of 3 amperes to provide for practical operation of the motor.

It will be assumed now that the motor is operated for a period of one hour and that the car is near the lower terminal floor with the down direction switch B, the motor armature and the relays C, D, E, P and Q energized. As the car nears the terminal, the car switch CS is centered thereby deenergizing the down switch B to stop the motor. The deenergization of the down switch B opens its contact members B1 and B2 thereby deenergizing motor armature 11 and stopping the motor. The deenergization of the switch B also opens its contact members B3 to reinsert the standing field resistor R3 in the motor field circuit and closes its contact members B4 to eliminate the resistor R2 from the field circuit.

As the motor decelerates, the relay C opens its contact members C1 to reinsert the resistor R1 in the armature circuit. The operation of the relay C also closes its contact members C2 to short circuit the resistor R2 in the motor field circuit to prepare that circuit for the next starting operation.

As the car and the motor come to a stop, the down limit switch BL opens thereby deenergizing the compensator operating relays P and Q, which, as above stated, operate their contact members to provide a 2-second period during which the increase or decrease relays F and G are rendered effective for operation.

Inasmuch as the motor has warmed up considerably by its running operation, the standing field current is now weakened to 2.8 amperes. Therefore, both measuring relays D and E drop out. The relay E dropping out opens its contact members E1, preventing energization of the decrease relay G but the dropping out of the relay D closes its contact members D1 thereby energizing the increase relay F.

The energization of the increase relay F closes its contact members F3 thereby energizing the resistance relay L by a circuit extending from the supply conductor LA through the contact members F3, G3, I4, K3 and the coil L to the supply conductor LB.

The energization of the resistance relay L closes its contact members L1 thereby short circuiting the compensating resistors R4 and R5 from the field winding circuit which strengthens the current in the field winding to approximately 3.1 amperes which is near enough to the selected ideal of 3 amperes to provide for the practical working of the motor.

The energization of the relay F opens its contact members F1 thereby deenergizing the chain operating relay J. The deenergization of the relay J opens its contact members J1 thereby deenergizing the relay H which, in turn, closes its contact members H1 to prepare a circuit for reenergizing the relay I. The deenergization of the relay H also opens its contact members H4 in the self-holding circuit of the resistance relay K thereby deenergizing that relay to take it out of the chain of operation.

At the end of the 2-second period, the relay Q opens its contact members Q1 thereby deenergizing the increase relay F. The deenergization of the relay F closes its contact members F1 for the purpose of reenergizing the chain operating relay I to prepare the circuits of the chain relays for operation.

By the foregoing, it will be seen that the compensating resistors are removed from the motor field winding circuit in accordance with the current in the field winding, that is, when the current in the field winding falls below a predetermined value, the compensating resistors act to decrease the resistance in the field circuit until the standing field current is brought up to the selected value.

In order to explain how the chain relays may be operated to correct for an increase in the current in the field winding instead of a decrease, it will be assumed that the machine is run for 6 hours; that it is so hot; that the compensating mechanism has operated to a point where the chain resistance relays K, L, M and N have been successively operated to short circuit the compensating resistors R4, R5, R6 and R7; that the machine stands for two hours cooling off, with the relays I and N energized; that the machine has again been placed in operation and is nearing the lower terminal.

When it is now placed in operation, its standing field current has, by reason of the change in resistance due to the cooling, risen to 3.3 amperes. It will also be assumed that the car is nearing the terminal with the down direction switch B energized, the armature energized and with the armature relay C, the measuring relays D and E, the compensating operating relays P and Q and the resistance relay N in an energized condition. As the car approaches the bottom landing, the car switch CS is centered thereby deenergizing the down direction switch B which opens its contact members B1 and B2 to stop the motor and also opens its contact members B3 to reinsert the standing field resistor R3 in the field circuit and closes its contact members B4 to eliminate the resistor R2 from the field circuit for the purpose of decelerating the motor and stopping it.

As the motor comes to a stop, the armature relay C opens its contact member C1 to reinsert resistor R1 in the armature circuit and also closes the contact members C2 to short circuit the resistor R2 in the motor field circuit.

The operation of these relays first increases the field circuit from a weak field condition of 5 amperes to a full field condition of 8 amperes and then reduces it to a standing field current which by reason of the temperature of the motor and the connection of the compensating resistors in the field circuit is now 3.3 amperes.

As the car comes to the terminal, the down limit switch DL opens, thereby deenergizing the compensator operating relays P and Q to prepare the increase and decrease relays for operation during a 2-second interval, by the measuring relays D and E.

The measuring relays D and E were both picked up by reason of the full field current being at 8 amperes and inasmuch as the field current is now at 3.3 amperes, both the measuring relays D and E remain picked up because 3.3 amperes is above their dropping out points.

Inasmuch as both relays D and E remain energized, the contact members D1 are opened and the contact members E1 are closed. Therefore, increase relay F is not energized and decrease relay G is energized. The energization of the decrease relay G energizes the resistance relay M by a circuit extending from the supply conductor LA through the contact members G4, F4, I3, N3 and the coil M to the supply conductor LB. The energization of the relay M causes it to close its contact members M1, thereby preparing a circuit for reinserting the compensating resistor R7 in the motor field circuit.

The energization of the decrease relay G also opens its contact members G1, thereby opening the short circuit around the relay H and thus energizing the relay H. The energization of the relay H opens its contact members H3, thereby deenergizing the resistance relay N which, in turn, opens its contact members N1 to complete the reinsertion of the compensating resistor R7 in the motor field circuit. With this resistor restored to the field circuit, the standing field current is now reduced to the desired 3 amperes.

The 2-second period is now expired causing the relay Q to drop out. Thereupon that relay opens its contact members Q1 thereby deenergizing the decrease relay G. The deenergization of the relay G closes its contact members G1, thereby energizing the chain operating relay J. The energization of relay J closes its contact members J1, which completes a circuit for maintaining the relay H in an energized condition but short circuits the relay I which thereupon drops out.

As the system stands at present, the resistance relay M is energized to maintain the correct value of compensating resistance in the field circuit so that the field current will have the desired value and the chain operating relays H and J are energized in preparation for any further change to be made in the compensating resistance.

In view of the foregoing description, it will be seen that I have provided a control system by means of which the amount of resistance in the field circuit is automatically controlled in accordance with the value of the current in the field, so that the standing field current may be maintained at such a predetermined value as will produce a constant speed and that, if the value of the current in the field changes by reason of a change in the amount of energy supplied or the resistance of the field windings due to temperature changes, poor connections, etc., the compensating system will automatically correct the field conditions until the desired value of current is maintained in the field.

Although I have illustrated and described only one embodiment of my invention, it is to be understood that many changes therein and modifications thereof may be made without departing from the spirit and scope of the invention as defined in the accompanying claims.

I claim as my invention:

1. In a control system for a dynamo electric machine having a field winding, means including a circuit for connecting said winding to a supply of electrical current, a resistance disposed to be connected in series relation in said circuit for controlling the current in the winding, and means operably responsive to a predetermined current in the winding for controlling the value of the resistance connected in the circuit.

2. In a control system for a dynamo electric machine having a field winding, means including a circuit for connecting said winding to a supply of electric current, a plurality of resistors, and means operably responsive to a predetermined current in the winding for connecting and disconnecting said resistors in series with the winding in said circuit to control the current in the winding at a predetermined value.

3. In a control system for a dynamo electric machine having a field winding, means including a circuit for connecting said winding to a supply of electric current, a plurality of resistors for said circuit to control the current in the winding, means for measuring the current in the winding, and means operably responsive to operation of said measuring means for selectively connecting and disconnecting a sufficient number of said resistors to said circuit to maintain the current in the winding at a predetermined value.

4. In a control system for a dynamo electric machine having a winding, means including a circuit for connecting the winding to a supply of electric current, a resistance for said circuit to control the current in the winding, means responsive to a predetermined current in the winding for connecting said resistance in said circuit to decrease the current in the winding to a predetermined value, and means responsive to another predetermined current in the winding for disconnecting the resistance from said circuit to increase the current in the winding.

5. In a control system for a dynamo electric machine having a winding, means including a circuit for connecting the winding to a supply of electric current, a resistance for said circuit to control the current in the winding, means responsive to a predetermined current in the winding for connecting said resistance in said circuit to decrease the current in the winding to a predetermined value, means responsive to another predetermined current in the winding for disconnecting the resistance from said circuit to increase the current in the winding, and means for preventing the operation of the connecting and disconnecting means during predetermined periods.

6. In a control system for a hoisting motor for operating an elevator car between two terminals, a field winding, means including a circuit for connecting the winding to a supply of electric current, a resistance for said circuit to control the current in the winding, means responsive to the current in the winding for connecting and disconnecting the resistance in the circuit to maintain the current in the winding at a predetermined value, and means operably responsive to operation of the car for rendering said connecting and disconnecting means effective only during selected periods.

7. In a control system for a hoisting motor for operating an elevator car between two terminals, a field winding, means including a circuit for connecting the winding to a supply of electric current, a resistance for said circuit to control the current in the winding, means responsive to the current in the winding for connecting and disconnecting the resistance in the circuit to maintain the current in the winding at a predetermined value, and means responsive to operation of the car for rendering said connecting and disconnecting means ineffective while the car is between terminals and effective for a predetermined interval of time when the car is at a terminal.

8. In a control system for a hoisting motor for operating an elevator car between two terminals, a field winding, means including a circuit for connecting the winding to a supply of electric current, a plurality of resistors, a plurality of contact members for connecting and disconnecting said resistors in said circuit to control the current in the winding, a plurality of chain resistance relays for controlling the contact members, a plurality of chain operating relays for controlling the resistance relays, an increase relay and a decrease relay for controlling the chain operating relays, and a plurality of measuring relays operably responsive to the value of the current in the winding for operating the increase relay when the current falls below a predetermined value and for operating the decrease relay when the current in the winding rises above a predetermined value.

9. In a control system for a hoisting motor for operating an elevator car between two terminals, a field winding, means including a circuit for connecting the winding to a supply of electric current, a plurality of resistors, a plurality of contact members for connecting and disconnecting said resistors in said circuit to control the current in the winding, a plurality of chain resistance relays for controlling the contact members, a plurality of chain operating relays for controlling the resistance relays, an increase relay and a decrease relay for controlling the chain operating relays, a plurality of measuring relays operably responsive to the value of the current in the winding for operating the increase relay when the current falls below a predetermined value and for operating the decrease relay when the current in the winding rises above a predetermined value, and operably responsive to the position of the car for rendering the increase relay ineffective at predetermined times.

WILLIAM F. EAMES.